Aug. 19, 1958     F. FAHNOE ET AL     2,848,391
METHOD OF MAKING A MULTIPLE LAMINATION CONSTRUCTION
Filed Oct. 19, 1953     2 Sheets-Sheet 1
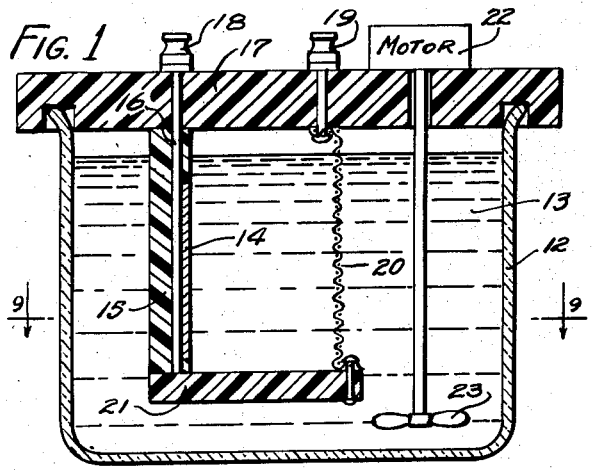
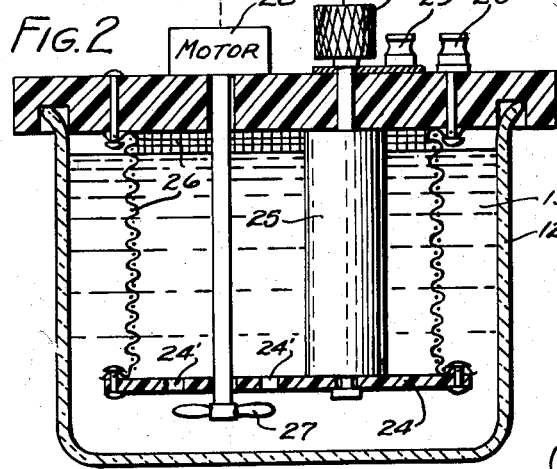
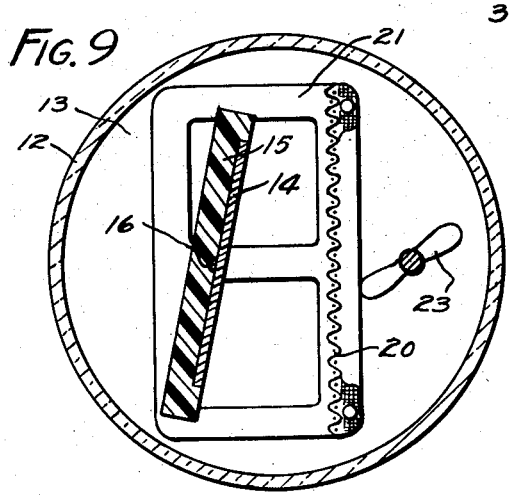
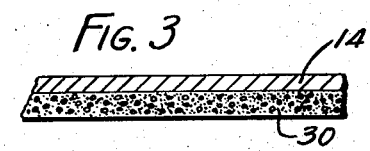
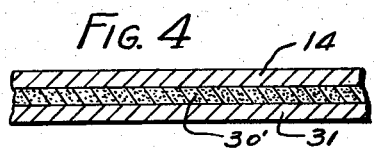
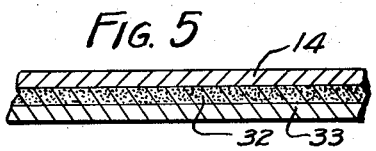
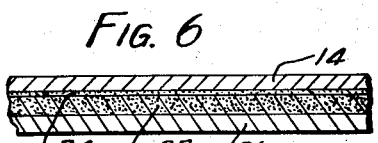
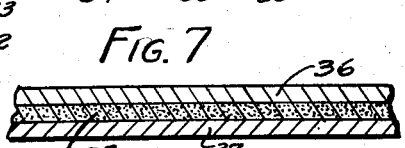
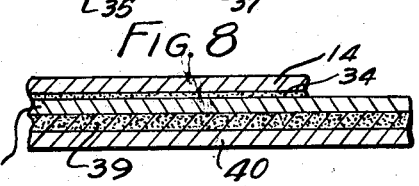
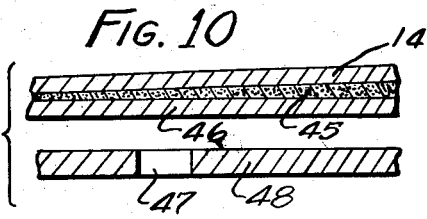
INVENTORS
FREDERICK FAHNOE
BY JAMES J. SHYNE
Mitchell & Bechert
ATTORNEYS

INVENTORS
FREDERICK FAHNOE
JAMES J. SHYNE
BY
ATTORNEYS

United States Patent Office 2,848,391
Patented Aug. 19, 1958

2,848,391

METHOD OF MAKING A MULTIPLE LAMINATION CONSTRUCTION

Frederick Fahnoe, Morristown, and James J. Shyne, Arlington, N. J., assignors to Vitro Corporation of America, New York, N. Y., a corporation of Delaware Application October 19, 1953, Serial No. 386,882

6 Claims. (Cl. 204—38)

Our invention relates to the application of electrophoretic-deposition techniques for development of composite strips or multiple-layer strips either as finished articles, or as steps toward the production of articles to be completed by further processing.

For many applications, it is desirable to develop one or more layers of constituent materials on one side of a given base material. Electroplating and other established techniques have their limitations, particularly in the case of non-conductive deposited materials, in which case these techniques are not available. Electrophoresis offers itself as an attractive method, but electrophoretically deposited layers, although well compacted, have relatively poor adherence and may be rubbed off with little or no effort. As far as is known to us, no suitable methods have thus far been available for securely bonding the electrophoretically deposited material to the plate or base to which it has been applied.

It is, accordingly, an object of the invention to provide improved processes utilizing electrophoretic deposition as one step therein.

It is another object to provide improved electrophoretic deposition methods featuring secure bonding of the deposited material.

It is still another object to provide improved bonding methods, including electrophoretic deposition as an important step, and by means of which methods secure bonding of the deposited material may be achieved without the application of heat.

It is a further object to provide improved laminated structures featuring the combination of an electrophoretically deposited layer with other laminations.

It is a specific object to provide methods and means whereby a bond may be developed completely around the particles of an electrophoretically deposited material, whether the bonding agent is introduced during the electrophoretic deposition or subsequent thereto.

It is another specific object to provide a heat-conductive sandwich with homogeneous heat-conductive outer layers and with an inner layer comprising a matrix of heat-conductive material intimately bonded in heat-conductive relation with the outer layers, the voids of said matrix being completely filled with an electrophoretically deposited material; more specifically, it is an object to provide an improved radioactive source in a construction of the character indicated, in which radioactive material fills the voids in the matrix, and in which the thickness of the covering layer is proportioned to the desired radiation intensity.

Other objects and various further features of novelty and invention will be pointed out or will occur to those skilled in the art from a reading of the following specification, in conjunction with the accompanying drawings. In said drawings which show, for illustrative purposes only, preferred forms and methods of the invention:

Fig. 1 is a vertical sectional view through a simplified apparatus for electrophoretically depositing a substantially flat compacted layer in accordance with the invention;

Fig. 2 is a similar sectional view through an apparatus for applying an electrophoretic deposit to a cylinder or mandrel;

Figs. 3 to 8 are enlarged, simplified, fragmentary cross-sectional diagrams illustrating steps in the development of several alternative composite or multiple-layer strips in accordance with the invention;

Fig. 9 is a sectional view more or less in the plane 9—9 of Fig. 1, and illustrating a slight modification to produce an electrophoretically deposited layer of varying thickness;

Fig. 10 is a simplified enlarged cross-sectional view of a fragment of a composite or multiple-layer strip incorporating the layer of varying thickness produced by the arrangement of Fig. 9;

Figure 11:
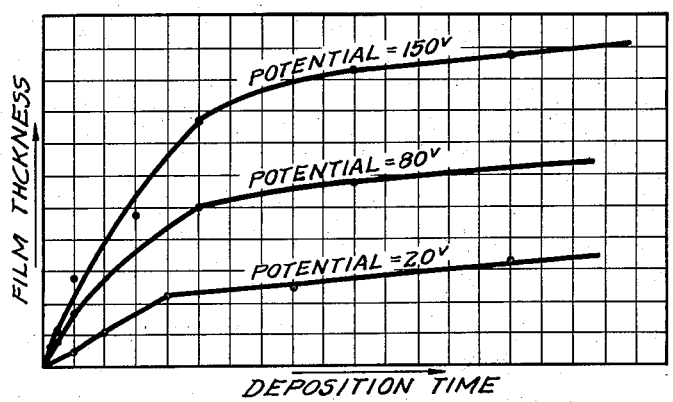
Figs. 11 to 13 are graphs which illustrate various relations between certain parameters of the electrophoretic process.

Electrophoretic deposition occurs when an electrostatic field is established between two electrodes immersed within a colloidal or gross dispersion of charged particles, thus causing the migration of the suspended particles toward one of the electrodes and producing the deposit of an adherent coating on that electrode. Exceptional uniformity of coating thickness and compacting (with an attendant relatively high coating density) are obtained, as compared with dipping, spraying, brushing, and other more conventional methods of application. Irregularly shaped objects can be coated with excellent uniformity and reproducibility of coating.

We have discovered that the inherent softness heretofore believed to be characteristic of electrophoretic deposits can be modified so that hard permanent electrophoretic deposits can be made upon the employment of suitable bonding methods. In one version of our method, a dispersion comprising non-conductors, semi-conductors and mixtures thereof are electrophoretically codeposited, and one of the codeposited materials ultimately becomes the binder. In another version, the binder can be applied after making the deposit, in which case electroless or electrolytically deposited binders are employed. The thickness of the coating can be tapered or otherwise non-uniformly developed in the deposition operation by sloping the electrodes relatively to each other so as to locally intensify the electrostatic field and therefore the rate of electrophoretical deposition. We have discovered that the electrophoretic process has unique directional properties, so that areas can be masked off by placing grids in front of the cathode, thereby localizing electrophoretic deposition.

In the methods and forms to be described, we show the bonding of electrophoretically deposited layers and the application of one or more covering layers to such deposits. The methods are particularly applicable to the construction of radioactive sources wherein the radioactive material, which can be a non-conductive oxide, can be deposited in extremely uniformly controlled thicknesses; for protective purposes, shields of suitable material and desired thickness can be intimately bonded to the electrophoretically deposited material and fully cover the radioactive deposit.

The deposition itself can be precisely controlled through close control of the main parameters of the electrophoretic process; i. e., the voltage applied between the electrodes, the relative spacing of the electrodes, the duration of the process, and the dispersion concentration. Although this precise control can only be obtained within certain parameter ranges described in more detail hereafter, in general the rate of deposition increases both with increased voltage and increased dispersion concentration and decreases with increased electrode spacing; the amount of deposition increases as the period of deposition is increased.

In our processes, the liquid phase, which is the carrier for the charged particles in the electrophoretic deposition, must be a relatively anhydrous non-conductive fluid. By a relatively anhydrous non-conductive fluid we mean a fluid having a conductivity falling within the range of $10^{-5}$ to $10^{-8}$ ohm-cm. Examples of this type of fluid are: alcohols such as methyl, ethyl and isopropyl alcohols; ketones such as acetone; esters such as ethyl acetate; and aromatics such as nitrobenzene.

The coating formed by the deposition can be composed of any element or compound which is capable of being colloidally dispersed. The colloidal dispersion need not be stable as long as the charged particles can be retained in dispersion through forced agitation or by the use of peptizing agents; such particles must have diameters falling within the range $1/100$ to 50 microns.

The base material which received the electrophoretic deposition (which is often referred to as substrate) must be a material which either inherently possesses electron-conduction bands, i. e., ferrous and non-ferrous metals and associated alloys; or which is capable under certain conditions of obtaining electron-conduction bands, i. e., semi-conductors.

We have discovered that the adherence of the electrophoretically deposited coating can be greatly increased through the use of electrostatic fields whose strength is greatly in excess of that conventionally used. For example, potentials ranging from 80 to 2000 volts have been used with considerable success. Even larger potentials can be used; the only requirement is that the potential be less than that which would cause dielectric breakdown of the media.

In one version of our method the coating and bonding materials are codeposited. In this situation, the coating and base materials must be of the type previously indicated; the bonding material must be a metal compound which after decomposition and reduction forms a metal binder. Such compounds, for example, can be: metal oxides, such as chromium oxide; metal carbonates, such as nickel carbonate; metal sulphates, such as copper sulphate; metal halides, such as cobalt chloride.

The bond is formed at the common surface between the binder and the base material through extensive diffusion of each material into the other.

When electrolytic deposition is employed, as in another version of our method, the bonding material must be a metal or alloy which is capable of being electrolytically deposited; for example, chromium, nickel or cobalt. In this situation, the bond is formed through mechanical meshing of the bonding and base materials at their common surface.

When "electroless" deposition is employed, the bonding material must be chosen from a small class of metallic compounds which are capable of being reduced to metal on the surface of the base material in the presence of a catalyst and without the application of heat. Examples of this class are cobalt and nickel. The bond formed by "electroless" deposition is similar to that formed by the co-deposition process; i. e., diffusion of the base and bonding materials into each other at their common surface.

Referring to Fig. 1 of the drawings, our invention is shown as being realizable in relatively simple apparatus which can include a vessel 12 containing a relatively non-conductive fluid 13; the fluid 13 can contain a colloidal or gross dispersion of the material or materials to be electrophoretically deposited, as upon the exposed surface of a base or plate 14. Plate 14 is shown fitted in a recess in a non-conductive supporting member or bracket 15 and containing conductive means 16 for contact with the plate 14, so as to define one electrode of the electrophoretic deposition circuit. The bracket 15 can be fixed to a removable cover on the bath or vessel 13, and binding posts or terminals 18—19 can also be carried by the cover, for connection to a source of electrical supply. The other electrode can be a flat grid or screen 20 of conductive wire, and to establish uniformity of electrode spacing, we illustrate attachment of upper and lower flanges of screen 20 to the cover 17 and to the supporting ledge 21 of bracket 15. To promote uniformity of the colloidal or gross dispersion throughout the deposition process, means 22 for continuously running an agitator 23 can be immersed in the fluid 13.

In Fig. 2, the parts will be recognized as being generally similar to Fig. 1, except that electrophoretic depositions are made on a cylinder, tube, or mandrel 25. Mandrel 25 is shown journalled in the cover and in a bottom plate 24, and means such as a hand knob 25' may suffice for continuous rotation of mandrel 25. If desired, mandrel 25 may be driven at uniform speed by motor means, as suggested by the dashed line connection 28' to motor 28, for agitator 27. The screen electrode 26 can be cylindrical, with anchoring flanges secured to the cover and to plate 24, and the field potentials to the screen 26 and mandrel 25 can be applied at terminals 26'—29. If desired, the bottom plate can be perforated or locally apertured, as at 24', in order to promote better dispersion of the material to be deposited.

The plating dispersion can be prepared by ball-milling the material to be deposited, thereby producing an electrical charge on the milled particles; for example, in preparing to manufacture radioactive sources in which the radioactive material is uranium dioxide or the mixed oxide of uranium, we ball-mill the oxide in isopropyl alcohol, although any relatively non-conductive fluid is adequate. If desired, milling can be followed by a sedimentation operation to control the maximum particle size of the dispersion; in this example, the maximum size is of the order of one micron. The particle charge developed upon ball-milling will determine electrode polarity for electrophoretic deposition and will depend upon the particular material under consideration, but for the case of uranium oxides the plate 14 will be the cathode. Thus, after sedimentation, the tube 25 or panel 14 to be coated can be mounted as the cathode in a plating bath, which, for the present illustrative case, contains two percent uranium dioxide dispersion in isopropyl alcohol. A potential of up to 2,000 volts D. C. is then applied to the electrodes for a period of 10 to 30 seconds; this potential represents a gradient of about 1000 volts/inch for electrodes of relatively small spacing, as used in batch preparations.

Figure 12:
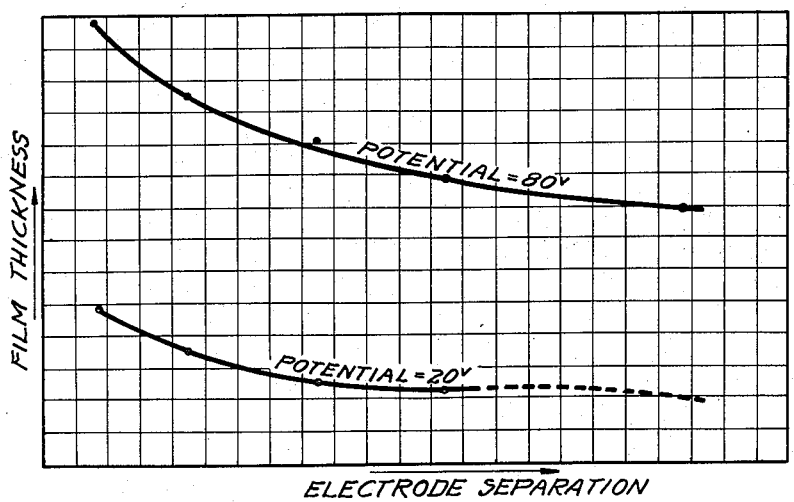
Figure 13:
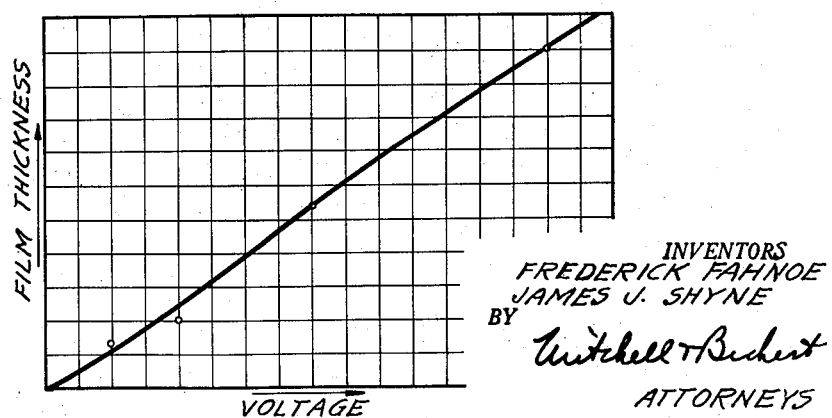

The relation between various bath parameters and the thickness of the electrophoretically deposited uranium dioxide coatings are shown in Figs. 11–13.

In Fig. 11, the relationship between coating thickness and deposition time is shown for three different electrode potentials. It will be seen that as the time increases, the rate of increase of thickness decreases until the thickness approaches a constant value which is directly dependent upon the magnitude of the applied potential.

In Fig. 12, the relationship between coating thickness and electrode separation is shown for two different electrode potentials. It will be seen that the thickness varies directly with the applied potential for any given value of electrode separation but decreases at a constantly decreasing rate as the separation increases.

In Fig. 13, the relationship between coating thickness and electrode potential is shown for a fixed deposition time. It will be seen that the curve is approximately a straight line.

These relationships in general hold true for all materials which can be electrophoretically deposited in the above manner, although the particular values depend upon the type of materials used.

In addition to uranium dioxide, we have succeeded in electrophoretically depositing coatings of many other materials as can be seen from Tables I and II wherein the various deposited materials are tabulated along with appropriate information as to particle size, dispersing medium, dispersion concentration, and the like.

After the described treatment, the coated part can be removed from the bath and dipped in isopropyl alcohol in order to set or coagulate the coating. Even so, the coating at this stage is very soft and can be rubbed off by hand. Nevertheless, the adherence is sufficient to permit the tube 25 or panel 14 to be handled, cut, bent, or further dipped, without having the coating crack or peel. After coagulation, the panel may be fired in hydrogen at a temperature less than the reducing temperature of the applied oxide, provided that it is desired to maintain the oxide coating; in the radioactive source under consideration, firing in hydrogen at 1000° C. considerably increases the hardness and adherence of the coating, but secure bonding as such does not exist, without further processing to be described.

duced metal is bonded intimately to the uranium dioxide particles. Foils or layers containing of the order of four times as much nickel as uranium dioxide have been found substantially completely and intimately to support all sides of the oxide particles, so that the oxide may be said to be suspended in a solid lattice or matrix of the supporting material; the completed layer or foil possesses a metallic appearance and is tough and flexible. For the materials indicated, foils containing 30 to 40 percent of the oxide are somewhat softer, and the oxide properties are more predominant.

Many different materials have been codeposited with subsequent reduction as can be seen from Table II wherein the various materials are tabulated along with other information appropriate to an understanding of the process.

In an alternative method, according to our invention, the bonding material is applied after electrophoretic dep-

*Table I*

| Coating Material | Particle size in Microns | Dispersing Medium | Dispersion Concentration, percent | Electrode Spacing (cm.) | Time of Deposition (sec.) | Coating thickness, microns | Base Substance | Applied Potential (volts) |
|---|---|---|---|---|---|---|---|---|
| SiC | <5.0 | C$_3$H$_7$OH | 2 | 4 | 30 | 25 | Stainless Steel | 500 |
| Al$_2$O$_3$ | <25 | C$_2$H$_7$OH | 2 | 4 | 30 | 40 | ----do---- | 100 |
| Al$_2$O$_3$ | <25 | C$_3$H$_8$O | 2 | 4 | 60 | 30 | ----do---- | 100 |
| WC | <40 | C$_3$H$_7$OH | 2 | 4 | 60 | 100 | ----do---- | 500 |
| B$_4$C | <40 | C$_3$H$_7$OH | 2 | 4 | 60 | 100 | ----do---- | 500 |

*Table II*

| Coating Composition | Particle size, microns | Dispersing Medium | Dispersion concentration, percent | Electrode spacing (cm.) | Time of Deposition (sec.) | Base Substance | Bonding Mat'l | Reduct. Temp. (°C.) | Coating Thickness (microns) | Applied Potential (volts) |
|---|---|---|---|---|---|---|---|---|---|---|
| 10% MoSi$_2$ / 90% NiO | <1.0 | C$_3$H$_7$OH | 2 | 3 | 10 | Stainless Steel | Ni | 800 | 20 | 250 |
| 10% MoSi$_2$ / 90% NiO | <10.0 | C$_3$H$_7$OH | 1 | 3 | 10 | ---do--- | Ni | 800 | 25 | 250 |
| 20% UO$_2$ / 80% NiO | <1.0 | C$_3$H$_7$OH | 2.0 | 3 | 5 | ---do--- | Ni | 800 | 25 | 100 |
| 25% Al$_2$O$_3$ / 75% NiO | <1.0 | C$_3$H$_7$OH | 2.0 | 3 | 5 | ---do--- | Ni | 800 | 10 | 100 |

*Table III*

| Coating Material | Base Substance | Bath Composition | Current Density (amps./sq. ft.) | Bonding Material |
|---|---|---|---|---|
| SiC | Stainless Steel | NiCl$_2$+H$_3$BO$_3$ | 10 | Ni |
| Al$_2$O$_3$ | ---do--- | NiCl$_2$+H$_3$BO$_3$ | 10 | Ni |
| WC | ---do--- | NiCl$_2$+H$_3$BO$_3$ | 10 | Ni |
| B$_4$C | ---do--- | NiCl$_2$+H$_3$BO$_3$ | 10 | Ni |

In accordance with one feature of the invention, we can promote bonding between deposited particles and, if desired, to the tube or panel upon which the deposit is made, by depositing the bonding agent along with the desired deposited material. In the case of a radioactive source, it is desirable that the bonding agent shall be heat conductive, as, for example, a metal. We have found that we can produce such a metal binder by reducing a metal oxide after deposition, and that to simplify the process mixtures of different oxides can be codeposited. Thus, for example, an oxide of uranium, as well as the binding oxide, such as nickel oxide or chromium oxide, can be codeposited in the same electrophoretic deposition, in generally the manner described above. The coated codeposited layer may then be fired in hydrogen at a temperature which will selectively reduce the undesired oxides, and, for the radioactive source under consideration, firing at 1100° C. will reduce the bonding oxide to the form of metallic nickel or metallic chromium. Examination of the cross-section of layers or foils thus prepared conclusively establishes that the reosition, and, therefore, no part of the electrophoretically deposited material need undergo any change in state or nature as a result of developing the bond. In our process, the adherence and essential continuity of the electrophoretically deposited film is such that the subsequently applied bonding deposit permeates the structure without altering the relationship of the electrophoretic deposit to the substrate. In this manner, the electrophoretic deposit retains its spatial relationship to the substrate.

Of course, for such subsequent introduction of bonding material, the electrophoretically deposited layer must be sufficiently porous to present openings through which the bonding agent can seep in order to develop the supporting lattice or matrix noted for the codeposition case discussed above. We have accomplished satisfactory bonding in a subsequent operation by several alternative methods, including electrolytic and "electroless" deposition.

In bonding electrolytically, the base plate 14 or tube 25 (or at least the surface thereof) upon which the electrophoretic deposit is to be made must be a conductor or semi-conductor. The electrophoretically coated specimen is submerged in an electrolytic bath and polarized as the plating electrode. The deposition develops in and through the pores of the electrophoretic deposit and, depending on the nature of the strike (applied as a preliminary treatment) on the base 14—25, the resulting plated layer or foil can be either intimately bonded to or strippable from the base 14—25. The deposition will solidly fill all pores and, if continued, can completely cover the electrophoretically deposited particles, thus forming an outer homogeneous layer of conductive material. When desired, this outer layer can be deposited to predictable and accurately controlled thicknesses, so that for the case of a radioactive source the outer layer can serve as a shield, and a uniform calibrated radioactive source can be provided.

All of the materials listed in Table I have been bonded to the indicated substrate by this electrolytic process. Table III lists these materials as well as appropriate information as to the composition of the bath, the current density for the operation and the composition of the bonding material.

In electroless deposition, the electrophoretically deposited layer is dipped in a solution or fluid which catalytically reacts with the deposited layer to cause reduction to a solid bonding material. For the case of the radioactive source employing an oxide of uranium as the electrophoretically deposited layer, the oxide will serve as a catalyst in the presence of nickel hypophophite, to promote reduction to metallic nickel as the bonding agent. Aluminum oxide has also been bonded to stainless steel by the same process.

With the above-described depositing and bonding methods we have been able to develop a number of specific methods for construction of composite or multiple-layer strip which, as indicated above, may find use in metal-coating and surface alloying, as well as in the construction of radioactive sources. In all of these methods, coatings 0.001 to 0.002-inch thick have been deposited in one operation, and there appears to be no limit to the thickness of the coating which can be developed by recycling with a number of successive depositing and bonding operations. Coatings up to 0.030-inch thick have, for example, been prepared by such recycling. In the following specific descriptions, no recycling will be described, but deposited layers will be understood to have been developed to desired thicknesses.

In Fig. 3, we illustrate the codeposition of mixed materials in a single electrophoretic process, resulting in development of the layer 30 over the base plate or panel 14. The heterogeneous nature of the codeposited mixture is suggested in the drawing by special sectioning wherein dotted fragments may be understood to represent the oxide not to be reduced and the larger circle-like fragments may represent the oxide to be reduced. In any case, the distribution of both kinds of particles will be understood to be uniform throughout the layer 30, and the thickness may also be uniform.

In Fig. 4, we illustrate that, upon heat treatment in a reducing atmosphere and at a temperature which will substantially reduce one constituent oxide to the exclusion of the other, the layer 30 shrinks to form the layer 30', constituting essentially only suspension of the unreduced oxide in the metal which results from reduction of the other oxide. This conversion is suggested in the drawing by cross-hatching the layer 30'. If desired, the layer 30' can be completely covered by a further layer 31 which can be developed in an electroplating process immediately after processing the layer 30'.

In Fig. 5, we illustrate a method for forming a multiple-layer structure similar to that in Fig. 4, but employing alternate steps. In Fig. 5, oxide or other material 32 can be electrophoretically deposited directly on the plate 14 and in the form in which it is ultimately to be employed; and we have suggested by common cross-hatching extending through the layer 32 and through the outer cover 33 that a single electroplating operation can serve to fill all voids or pores between electrophoretically deposited particles. In this manner, there can be developed a lattice or matrix intimately bonded to the base 14, intimately bonding the particles to each other, and intimately bonding the outer cover plate 33 to the lattice.

Fig. 7 shows another multiple-layer strip, resembling those of Figs. 4 and 5, but developed by a method utilizing the step illustrated in Fig. 6, and featuring reuse of the base or panel 14. The process again begins with the same base or panel 14, but since this base is to be reusable, we apply a thin layer 34 of graphite (or other suitable conductive lubricant) in lieu of a metal strike, so that all deposited layers can be readily stripped from the base 14 when necessary. The electrophoretically deposited layer 35 can be applied directly to the graphite, and a binder or retaining matrix developed by one of the several methods indicated above; however, by the cross-hatching extending over the deposited layer 35 and over the cover 36, we schematically indicate that a single electroplating process can not only bond the deposited particles to each other but also cover all particles with a homogeneous outer cover 36. After application of layer 36 to the desired thickness, the composite strip 35—36 is peeled or stripped from the base plate 14, and in Fig. 7 we indicate at 37 that, if desired, a further cover can be electroplated to the side of the deposited layer which is exposed after peeling or stripping.

In Fig. 8, we illustrate a method whereby a peeled or stripped composite sheet can be prepared without the need for removal of the deposited layer until the strip has been fully prepared. Thus, the base plate 14 and graphite or other lubricant layer 35 serve as a base against which one cover plate 38 is developed as by means of electroplating. The deposited layer 39 is then applied to plate 38 by electrophoretic means; and the deposited layer is bonded to plate 38, sealed in an integral lattice, and covered by means of one single further electroplating operation, as suggested by the common cross-hatching extending through the deposited layer 39 and through the outer cover 40. Upon completion of the outer layer 40, the composite sheet has been fully prepared, and is ready for stripping, so that the base plate 14 can be reused for the production of further strips.

In Figs. 9 and 10, we illustrate that our process lends itself to the production of electrophoretically deposited layers of desired varying thickness, as, for example, a thickness varying uniformly along one dimension of the base plate 14. We have found that by suitably orienting the two electrodes used in the electrophoresis bath, as by having the electrode faces converge toward each other as suggested in Fig. 9, the electrostatic field governing electrophoretic application of deposited articles at one end of the plate 14 is substantially stronger than elsewhere on the plate 14. The variation in field strength will be accompanied by corresponding variation in deposited material, with the result that the electrophoretically deposited layer 45 is of uniformly varying tapered thickness. Once the wedge-shaped deposit 45 has been applied, bonding is achieved by one of the methods indicated above; the cross-hatching in Fig. 10 suggests bonding by reduction of a codeposited binder oxide. Also, if desired, a protective cover or sheath 46 can be applied electrolytically. It will be appreciated that, when used opposite a window (as suggested at 47) in a sheath 48 of radiation-absorbing material, our laminated source 14—45—46 provides means whereby, upon laterally shifting the window 47 with respect to said source, small and carefully controlled variation of radiation intensity will be available through window 47.

It will be seen that we have described essentially simple methods for the carefully controlled deposition and permanent bonding of a suspended material. The various binding and layer development methods disclosed have important applications in surface-alloying and other treatment of metals and in the construction of radioactive sources. The bonding coatings are strongly adherent and lend themselves to conventional metallurgical forming operations such as rolling, seam-welding, wire-drawing, and the like.

While we have described the invention in detail for the preferred forms and methods shown, it will be understood that modifications may be made within the scope

We claim:

1. The process of preparing a multiple strip on a conductive base which comprises electrophoretically depositing a porous layer comprising particles of a relatively non-conductive radioactive material on said base, bonding said particles to each other and to said base by forming a metal matrix permeating the pores of said layer whereby said radioactive material is dispersed throughout said metal matrix, and electrodepositing an outer sheath of metal over the bonded electrophoretically deposited layer.

2. The process of claim 1 wherein the metal matrix bond is achieved by electroplating metal within the pores of said electrophoretically deposited layer followed by continuing said electroplating to produce an outer sheath of metal over the thus-bonded electrophoretically deposited layer.

3. The process for preparing a multiple layer strip on a conductive base, which comprises electrophoretically codepositing a layer of a mixture of metal oxides on said base, said metal oxides characterized by different temperatures of reduction in a reducing atmosphere, and heating the deposited layer in a reducing atmosphere at a temperature selective to the reduction to metal of one of said oxides in preference to the other, said temperature being sufficient to produce a solid metal matrix intimately bonded to and surrounding said unreduced oxides, whereby said oxides are dispersed substantially uniformly through said bonding metal matrix.

4. The process according to claim 3 wherein the steps of electrophoretically codepositing and selectively reducing said layer are repeated after reduction of one constituent of said codeposited layer, whereby a thicker metal-bonded oxide layer is developed.

5. A process of preparing a multiple layer strip on a base material, which comprises electrophoretically codepositing a layer of a mixture of uranium oxide and aluminum oxide, said oxides characterized by different temperatures of reduction in a reducing atmosphere, and heating the deposited layer in a reducing atmosphere selective to the reduction to metal of one of said oxides in preference to the other, said temperature being sufficient to produce a metal matrix surrounding said unreduced oxide, whereby said oxide is dispersed through said metal matrix.

6. A process of preparing a multiple layer strip on a base material, which comprises electrophoretically codepositing a layer of a mixture of uranium oxide and chromium oxide, said oxides characterized by different temperatures of reduction in a reducing atmosphere, and heating the deposited layer in a reducing atmosphere selective to the reduction to metal of one of said oxides in preference to the other, said temperature being sufficient to produce a metal matrix surrounding said unreduced oxide, whereby said oxide is dispersed through said metal matrix.

References Cited in the file of this patent

UNITED STATES PATENTS

| | | |
|---|---|---|
| Re. 12,567 | Case | Nov. 27, 1906 |
| 2,020,117 | Johnston | Nov. 5, 1935 |
| 2,143,636 | Tone | Jan. 10, 1939 |
| 2,405,026 | Feuer | July 30, 1946 |
| 2,476,644 | Wallhausen et al. | July 19, 1949 |
| 2,479,882 | Wallhausen et al. | Aug. 23, 1949 |
| 2,525,035 | Joris | Oct. 10, 1950 |
| 2,530,546 | Snyder | Nov. 21, 1950 |
| 2,640,024 | Palmateer | May 26, 1953 |
| 2,650,975 | Dorst | Sept. 1, 1953 |
| 2,708,726 | Atherton | May 17, 1955 |
| 2,711,390 | Childers et al. | June 21, 1955 |
| 2,734,857 | Snyder | Feb. 15, 1956 |

FOREIGN PATENTS

| | | |
|---|---|---|
| 1,044,212 | France | June 17, 1953 |